United States Patent [19]

Horblin

[11] 4,216,520
[45] Aug. 5, 1980

[54] SPEED RESTRICTION CONTROL DEVICE FOR VEHICLES, PARTICULARLY MOTOR VEHICLES

[75] Inventor: Michel Y. Horblin, Courbevoie, France

[73] Assignees: Societe Anonyme Automobiles Citroen; Automobiles Peugeot, both of Paris, France

[21] Appl. No.: 906,215

[22] Filed: May 15, 1978

[30] Foreign Application Priority Data

May 23, 1977 [FR] France ................................ 77 15687

[51] Int. Cl.² ............................................ B60K 31/00
[52] U.S. Cl. .................................. 361/239; 361/186; 180/167; 246/182 C
[58] Field of Search ............... 361/236, 239, 242, 182, 361/186; 246/30, 182 C; 307/9, 10 R; 180/98, 108, 167, 176, 177, 179; 340/53, 62, 670

[56] References Cited

U.S. PATENT DOCUMENTS

| | | | |
|---|---|---|---|
| 3,149,691 | 9/1964 | Snell et al. | 180/98 |
| 3,270,199 | 8/1966 | Smith | 180/98 UX |
| 3,368,639 | 2/1968 | Deane | 180/98 |
| 3,378,102 | 4/1968 | Collin et al. | 180/98 |
| 3,763,954 | 10/1973 | Permut et al. | 246/182 C |
| 3,808,427 | 4/1974 | Malon et al. | 246/182 C |
| 3,997,869 | 12/1976 | Mayer | 307/10 R |
| 4,039,043 | 8/1977 | Mann et al. | 180/108 |

Primary Examiner—Harry E. Moose, Jr.
Assistant Examiner—L. C. Schroeder
Attorney, Agent, or Firm—Stevens, Davis, Miller & Mosher

[57] ABSTRACT

A device comprising receiving means mounted on the vehicle, means for establishing an electrical reference voltage corresponding to the speed limit and means for controlling the speed of the vehicle response to the electrical reference voltage. It comprises a capacitor used as a memory connected to the speed control means and means for updating the voltage at the terminals of the capacitor, adapted for connecting an electrical voltage source to the terminals of the capacitor when the vehicle enters the information transmission field, then to isolate the capacitor from this voltage source after a given time.

7 Claims, 4 Drawing Figures

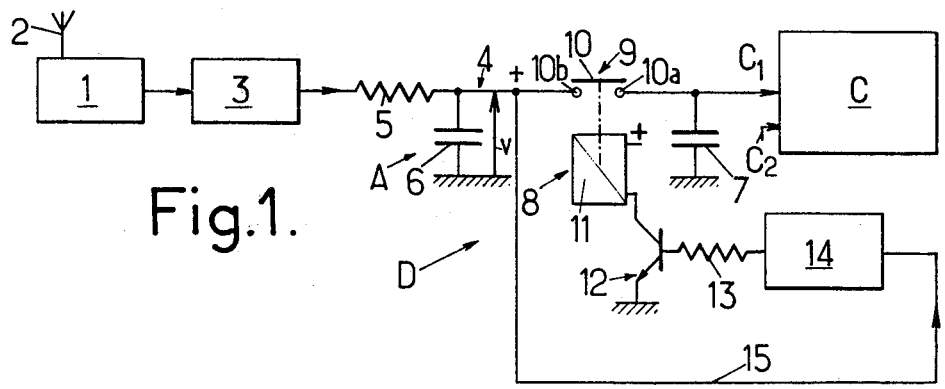
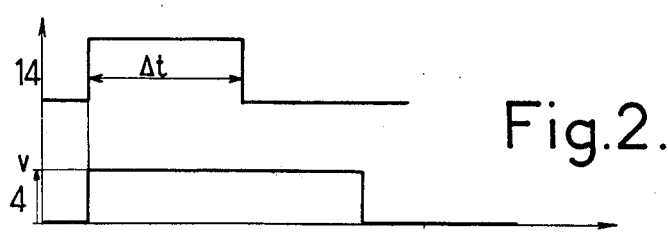
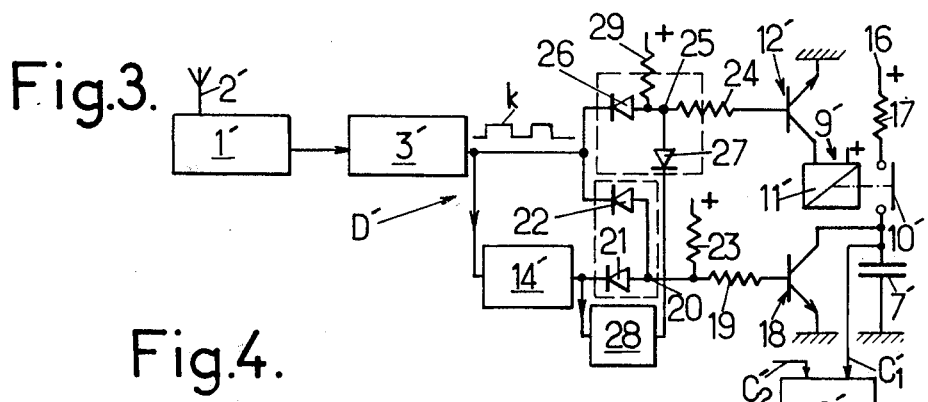
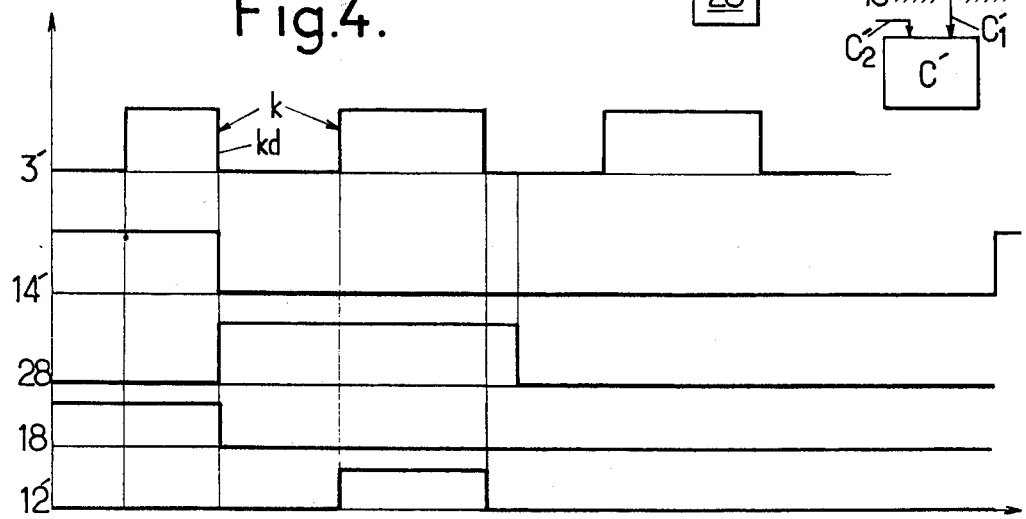

SPEED RESTRICTION CONTROL DEVICE FOR VEHICLES, PARTICULARLY MOTOR VEHICLES

The invention relates to a device for automatically controlling a speed restriction of a vehicle, particularly a motor vehicle travelling over a stretch of speed-restricted road, from information coming from outside the vehicle and transmitted by radio waves, a device of the kind comprising:

receiving means mounted on the vehicle, for collecting the outside information;

means for providing, from the information received, an electrical reference voltage corresponding to the speed limit;

means for controlling the speed of the vehicle, responsive to the electrical reference voltage, adapted to maintain the speed of the vehicle equal to the speed limit on the stretch of road concerned.

The invention has as an aim, especially, to provide a device which answers better than heretofore the different requirements of practice and particularly such that its construction is simplified.

According to the invention a device for automatically controlling a speed restriction of a vehicle, of the kind defined above, is characterised by the fact that it comprises:

a capacitor used, in a way known per se, as a memory adapted to store the value of the electrical reference voltage applied to the terminals of this capacitor, which is connected to the speed control means;

and means for updating the voltage at the terminals of this capacitor, these updating means being responsive to the reception of information coming from outside and being adapted, when the vehicle enters the information transmitting field, to connect an electrical voltage source to the terminals of the capacitor, then to isolate the capacitor from this voltage source, after a given length of time.

When the outside information is contained in a frequency, said electrical voltage source is advantageously formed by an integrator circuit preceded possibly by a shaping circuit adapted to deliver at its output an electrical voltage directly related to the frequency; the updating means then comprise a switching device adapted to close, and to connect the capacitor to the output of the integrator circuit, when a voltage appears at the output of the integrator circuit and timing means formed particularly by a monostable circuit adapted to open the switching device after a given time, sufficient to allow the updating of the voltage at the terminals of the capacitor.

When the outside information is contained in the width of a square wave pulse, said electrical voltage source is advantageously formed by an auxiliary constant DC voltage source; the updating means comprise a device for short-circuiting the terminals of the capacitor when the vehicle enters the field of information transmission, so as to discharge the capacitor; this device, for short-circuiting the capacitor is activated by the first square wave pulse received then is de-activated for the following square wave pulses; a switching device is provided for closing during a following square wave pulse, particularly the second square wave pulse, and for connecting the capacitor to the auxiliary voltage, through a load resistor, so that the voltage at the terminals of the capacitor depends directly on the duration of the square wave pulse; this switching device opening at the end of each square wave pulse so as to isolate the capacitor from the auxiliary voltage source.

The means for short-circuiting the capacitor comprise preferably a transistor whose emitter and collector are connected to the terminals of the capacitor and whose base is connected to the output of an AND gate comprising two inputs driven respectively by the square wave pulses received and by the output of a re-triggerable monostable circuit controlled by the square wave pulses and adapted to switch with the descending edge of the first square wave pulse and to remain switched during the whole time that square wave pulses are received.

The transistor is advantageously of the NPN type and the AND gate comprises two diodes whose anodes are connected to the base of the transistor through a resistor, whereas the cathodes are connected respectively to the output of the receiver and to the output of the re-triggerable monostable circuit.

The switching device, both when the outside information is contained in a square wave pulse and when it is contained in a frequency, comprises an electrical contact of a relay whose winding is controlled by a transistor, this transistor is in its turn controlled by a monostable circuit whose output is connected to the base of this transistor.

In the case where the outside information is contained in a square wave pulse, the base of the transistor controlling the relay is connected through a resistor to the output of an AND gate having two inputs driven respectively by the square wave pulses received and by the output signals of a second monostable whose input is connected to the output of a re-triggerable monostable circuit; this second monostable is adapted to switch with the descending edge of the output of the re-triggerable monostable and to return to its pretrigger state after a given time, characteristic of said second monostable; this time is chosen so that a single square wave pulse may act on the transistor controlling the relay of the switching device. The transistor controlling the relay is advantageously of the NPN type and the AND gate comprises two diodes whose anodes are connected to the base of the transistor whereas the cathodes are connected respectively to the output of the receiver and to the output of the second monostable circuit.

The invention consists, apart from the arrangements outlined above, of certain other arrangements which will be discussed more explicitly hereafter in connection with particular embodiments with reference to the accompanying drawings but which are in no wise limiting.

FIG. 1 of these drawings is a block diagram of a device according to the invention for automatically controlling a speed restriction from information contained in a frequency.

FIG. 2 shows schematically the signals obtained at different points of the circuit of FIG. 1.

FIG. 3 is a block diagram of the device according to the invention for operation with information contained in square wave pulses of given width.

FIG. 4 finally shows schematically the signals obtained at different points of the circuit of FIG. 3.

Referring to FIG. 1 a device D can be seen for automatically controlling a speed restriction of a motor vehicle from information coming from outside.

This information is transmitted by radio waves, e.g. from radio beacons disposed at the edge of the road on which the vehicle is travelling.

Device D comprises a receiver 1 mounted on the vehicle for collecting the outside information. There is schematically shown at 2 an antenna connected to receiver 1. The output of receiver 1 is connected to the input of a circuit 3 for shaping the signals received.

Means A are provided for establishing, from the information received, an electrical reference voltage shown schematically by arrow V, corresponding to the speed limit.

Device D of FIG. 1 is meant to operate with outside information contained in the frequency of the signals picked up by receiver 1.

Means A comprise an integrator circuit 4 shown schematically by a resistor 5 and a capacitor 6 connected between a resistor end and earth. The input of resistor 5 is connected to the output of shaping circuit 3. The values of the resistor and of capacitor 6 are determined so as to ensure proper integration.

Thus, electrical voltage V obtained at the terminals of capacitor 6, through integration of the signals picked up, depends directly on the frequency of these signals.

Device D also comprises means C for controlling the speed of the vehicle, responsive to the reference voltage V provided by integrator circuit 4. Means C is adapted to maintain the speed of the vehicle equal to the speed limit, on the stretch of road concerned. Means C may comprise a comparator circuit for comparing the reference voltage V, received at input $C_1$, with an electrical voltage depending on the real speed of the vehicle and provided by an appropriate sensor (not shown) connected to an input $C_2$ of control means C. The output of the comparator circuit is connected to means for controlling the opening of the throttle valve of the engine of the vehicle, of the kind described and claimed in Patent Application:

U.S. Ser. No. 704,757 filed on 12th July, 1976.

Device D comprises a capacitor 7 used as a memory adapted to store the value of the electrical reference voltage and means 8 is used for updating the voltage at the terminals of this capacitor.

The updating means 8 comprise a switching device 9 adapted to close and to connect a terminal of capacitor 7 to the output of integrator circuit 4 when a voltage appears at the output of this circuit 4.

The other terminal of capacitor 7 is connected to earth.

Switching device 9 comprises an electrical contact 10 of a relay whose winding 11 is controlled by a transistor 12, advantageously of the NPN type. The emitter of transistor 12 is connected to earth, whereas its collector is connected to one end of winding 11. The other end of this winding is connected to the positive terminal of a DC supply. A terminal 10a of the electrical contact is connected to a terminal of capacitor 7, whereas the other terminal 10b of the contact is connected to the output of integrator 4. Contact 10 is closed and provides a connection between terminals 10a and 10b when winding 11 is energized (work contact).

The base of transistor 12 is connected through a resistor 13 to the output of a monostable circuit 14. The input of this monostable circuit 14 is connected by a conductor 15 to the output of integrator 4. Monostable 14 is arranged so that in its pretrigger state its output is at a low state corresponding to a zero voltage in relation to earth, so that transistor 12 is disabled; when monostable 14 has switched, its output is at a high state (positive voltage), so that transistor NPN 12 is enabled.

The switching time of monostable 14 is sufficient for the capacitor 7, connected during switching time to the output of integrator 4, to reach voltage V.

Monostable circuit 14 is furthermore arranged to switch with the rising edge of the signal at the output of integrator 4, i.e. when a voltage appears at the output of this integrator. Monostable 14 then switches when the vehicle enters the field of information transmission.

The operation of device D of FIG. 1 is the following.

When the vehicle enters the field of a radio beacon, a reference voltage V appears at the output of integrator 4.

In FIG. 2, the second line represents the voltage, shown on the Y-axis, with respect to time, shown on the X-axis, at the output of integrator 4. The presence of the voltage corresponds to the length of time that the vehicle travels through the field of transmission of the beacon.

With the appearance of voltage V, monostable 14 switches so that its output passes to the high state; transistor 12 is enabled so that relay 11 is energized and work contact 10 closes.

Voltage V is applied to the terminals of capacitor 7; this voltage corresponds to the new speed limit.

After a given time Δt sufficient for updating the voltage at the terminals of capacitor 7, and less than the time taken for the vehicle to pass through the field of the beacon, monostable 14 returns to its normal, pretrigger state; transistor 12 ceases to conduct and contact 10 opens so that capacitor 7 is isolated from the voltage source formed by integrator 4.

The first line of FIG. 2 represents the electrical voltage (shown on the Y-axis) at the output of monostable 14 with respect to time shown on the X-axis. It can be seen that the rising edge at the output of monstable 14 is produced at the same time that the rising edge is produced at the output of integrator 4, whereas the descending edge at the output of the monostable is produced before the descending edge of the output of integrator 4, which causes the memory to be isolated before the integration voltage begins to decrease when leaving the beam of the beacon.

It will be noted that capacitor 7, when contact 10 closes, is charged or discharged depending on whether the new voltage V at the output of integrator 4 is greater or less than the voltage which exists at the terminals of capacitor 7 before contact 10 closes.

It should be noted that capacitor 6 could be omitted and that capacitor 7 could alone serve as capacitor for integrator circuit 4; in this case, it would be necessary to provide a device other than monostable 11 as timing means for causing transistor 12 to be enabled for a given time.

Referring to FIG. 3 there is shown a device D' according to the invention provided for operating with outside information contained in cyclically transmitted square wave pulses; the duration of the square wave pulses depends on the speed limit.

This device comprises elements identical or playing a similar role to elements already described in FIG. 1.

These elements are shown with the same reference numbers to which "'" has been added. Their description will not be taken up again in detail.

There is schematically shown at k the square wave pulses obtained at the output of shaping circuit 3'.

Device D' is arranged so as to charge capacitor 7' from an auxiliary constant DC voltage source 16 through a load resistor 17. The charging time of capacitor 7' is equal to the width of a square wave pulse; previous to the charging of capacitor 7', the terminals thereof are short-circuited to completely discharge capacitor 7'.

Therefore, at the end of the charging time, the voltage which exists at the terminals of capacitor 7' is related directly to the width of the square wave pulses.

The means for short-circuiting the terminals of the capacitor then for charging this capacitor 7' are described hereafter.

The means for short-circuiting the terminals of capacitor 7' comprise a transistor 18, advantageously of the NPN type, whose emitter is connected to earth; one terminal of capacitor 7' is also connected to earth. The collector of transistor 18 is connected to the other terminal of capacitor 7'. When transistor 18 is not conducting, capacitor 7' stores its charge; when the transistor is enabled, the terminals of capacitor 7' are practically short-circuited and the charge of this capacitor is completely cancelled out.

The base of transistor 18 is connected, through a resistor 19, to a point 20 common to the anodes of two diodes 21, 22; the cathode of diode 21 is connected to the output of a first monostable circuit 14' whereas the cathode of diode 22 is connected to the output of shaping circuit 3'. Common point 20 is also connected through a resistor 23 to the positive pole shown schematically by the sign "+" of a DC voltage source.

Monostable circuit 14' is re-triggerable by square wave pulses k and is adapted to switch when a descending edge of a square wave pulse appears. The output of monostable circuit 14' connected to the cathode of diode 21 is at a high state, corresponding to a positive voltage, when monostable 14' is in its normal state; when monostable 14' is switched, its output is at a low state corresponding to a zero voltage.

The operation of transistor 18 to short-circuit capacitor 7' will be explained herebelow.

A switching device 9' is provided between the positive terminal of capacitor 7' and the end of resistor 17. This device 9', similarly to that of FIG. 1, comprises an electrical work contact 10' of a relay whose winding 11' is controlled by a transistor 12' of the NPN type.

The emitter of transistor 12' is connected to earth whereas its collector is connected to a terminal of winding 11'. The other terminal of this winding is connected to the positive terminal of a DC source. The base of transistor 12' is connected through a resistor 24 to a common point 25 itself connected to the anodes of two diodes 26 and 27.

The cathode of diode 26 is connected to the cathode of diode 22 and so to the output of shaping circuit 3'.

The cathode of diode 27 is connected to the output of a second monostable circuit 28. The input of this circuit 28 is connected directly to the output of monostable circuit 14'.

Common point 25 is furthermore connected through a resistor 29 to the positive terminal of a DC source.

The two diodes 21 and 22 form together an AND gate; similarly the two diodes 26 and 27 also form an AND gate.

The operation of the device of FIG. 3 is the following.

When the vehicle enters the field of transmission of a radio beacon, it receives a first square wave pulse, schematically shown at the left-hand end of the first line of FIG. 4.

In this representation, the time is shown along the X-axis and, along the Y-axis, the electrical voltage at the output of shaping circuit 3'.

It will be noted that the first square wave pulse can only be partially received by receiver 2' since the vehicle is just beginning to enter the transmission field; to illustrate this fact, the width of the first square wave pulse of the upper line of FIG. 4 has been shown smaller than that of the following square wave pulses which, as far as they are concerned, are completely received by the vehicle which is in the transmission field.

A partial reception may however take place also for the last square wave pulse picked up by receiver 1' when the vehicle leaves the transmission field of the beacon.

The descending edge $k_d$ (FIG. 4) of the first square wave pulse controls the switching of the output of monostable circuit 14'; the voltage at this output is shown on the second line of FIG. 4. Until monostable 14' switches, a positive voltage is shown at its output; after switching the voltage is zero, which means that the cathode of diode 21 is connected to earth. Since monostable 14' is of the re-triggerable type, the successive square wave pulses received during the whole time that the vehicle is travelling in the transmission field of the beacon maintains the output of monostable 14' switched.

The fourth line of FIG. 4 shows, with respect to time shown along the X-axis, the voltage at the base of transistor 18.

During reception of the first square wave pulse (possibly partial) the output of monostable 14' is at a positive voltage, as well as the output of shaping circuit 3'.

So, the cathode of diode 21 and the cathode of diode 22 are at a positive voltage. The result is that a positive voltage is present at the base of transistor 18 which is conducting.

Capacitor 7' is thus short-circuited for the duration of the first square wave pulse which causes the complete discharge of this capacitor.

At the end of the first square wave pulse, monostable 14' switches and its output goes to zero voltage; the cathode of diode 21 is thus brought to earth potential; the same goes for common point 20, except for the small voltage drop produced across diode 21. The base of transistor 18 is thus brought to a practically zero voltage and the transistor is disabled. This state will exist during the whole time that the vehicle is travelling in the transmission field of the beacon.

The output of monostable circuit 28 is at zero voltage in its normal state as shown on the third line of FIG. 4; this output passes to a positive voltage when monostable 28 switches. This switching takes place with the descending edge at the output of monostable 14'; the output of monostable 28 returns to its normal state after a given time, characteristic of monostable 28. This time is such that the descending edge of the voltage signal at the output of monostable 28 is comprised between the descending edge of the second square wave pulse and the rising edge of the third square wave pulse shown on the first line of FIG. 4.

The base of transistor 12' will only be brought to a positive voltage, enabling transistor 12' when a positive voltage is present at the output of shaping circuit 3' (cathode of diode 26) and at the output of monostable 28 (cathode of diode 27). As can be seen from the fifth line of FIG. 4, this condition is only fulfilled during the duration of the second square wave pulse.

Contact 10' will then close for the whole duration of the second square wave pulse.

Capacitor 7' will be charged at a voltage directly tied to the closing time of contact 10 and so to the duration of the square wave pulse. Thus, it appears that the first square wave pulse received, which can only be partial, controls the discharge of capacitor 7', whereas the second square wave pulse, complete, controls the charging of the capacitor, at a constant DC voltage.

When the vehicle leaves the transmission field, the output of monostable 14' again passes to a positive voltage. But, because the output of shaping circuit 3' is at zero voltage, due to the absence of square wave pulses which are no longer picked up by receiver 1', common point 20 remains at a substantially zero voltage because of diode 22 and transistor 18 remains disabled. Capacitor 7' holds its voltage.

As soon as the vehicle leaves the transmission field of the beacon, the drop-out of monostable 14' allows the device to be again in the ready state.

It is clear that relay 11 of FIG. 1 or 11' of FIG. 3 could be replaced by a transistor.

The device of the invention is of simple construction while ensuring an automatic speed restriction.

I claim:

1. A device for automatically controlling a speed restriction of a vehicle travelling over a stretch of speed restricted road, from information transmitted by radio waves from outside the vehicle, said transmitted information being in the form of a square wave signal, comprising:

receiving means mounted on the vehicle for collecting the outside information;

means for providing an electrical reference voltage corresponding to the speed limit from the information received;

a capacitor used as a memory for storing the value of the electrical reference voltage applied to the terminals of this capacitor;

means for updating the voltage at the terminal of the capacitor comprising: a device for short-circuiting the terminals of the capacitor when the vehicle enters the field of transmission of the information in response to the first square wave pulse received, whereby the capacitor is discharged, the device being deactivated during succeeding square wave pulses;

a switching device provided for closing during a succeeding square wave pulse, the switching device connecting an auxillary voltage source through a load resistor to the capacitor whereby the voltage at the terminals of the capacitor is related to the width of the succeeding square wave pulse, the switching device opening at the end of the succeeding square wave pulse whereby the capacitor is isolated from the auxillary voltage source, and means for controlling the speed of the vehicle in response to the voltage across said capacitor whereby the speed of the vehicle is maintained equal to the speed limit over the stretch of road concerned.

2. A device according to claim 1, characterised by the fact that the device for short-circuiting the capacitor comprise a transistor whose emitter and collector are connected to the terminals of the capacitor and whose base is connected to the output of an AND gate comprising two inputs driven respectively by the square wave pulses received and by the output of a re-triggerable monostable circuit controlled by the square wave pulses and adapted to switch with the descending edge of the first square wave pulse and to remain switched during the whole time of reception of square wave pulses.

3. A device according to claim 2, characterised by the fact that the transistor is of the NPN type and that the AND gate comprises two diodes whose anodes are connected to the base of the transistor through a resistor, whereas the cathodes are connected respectively to the output of the receiver and to the output of the re-triggerable monostable.

4. A device according to claim 1, characterised by the fact that the switching device comprises an electrical contact of a relay whose winding is controlled by a transistor, which transistor is itself controlled by a monostable circuit whose output is connected to the base of this transistor.

5. A device according to claim 2, for operation with outside information contained in a square wave pulse, in which the switching device comprises an electrical contact of a relay whose winding is controlled by a transistor, which transistor is itself controlled by a monostable circuit whose output is connected to the base of this transistor, characterised by the fact that the base of the transistor controlling the relay is connected through a resistor to the output of an AND gate having two inputs driven respectively by the square wave pulses received and by the output signals of a second monostable circuit whose input is connected to the output of the re-triggerable monostable circuit, this second monostable being adapted to switch with the descending edge of the output of the re-triggerable monostable and to return to its rest state after a given time selected such that a single square wave pulse may act on the transistor controlling the relay of the switching device.

6. A device according to claim 5, characterised by the fact that the transistor controlling the relay is of the NPN type and that the AND gate comprises two diodes whose anodes are connected to the base of the transistor, whereas the cathodes are connected to the output of the receiver and to the output of the second monostable circuit.

7. A device according to claim 4 for operation with outside information contained in a frequency, characterised by the fact that the monostable circuit controlling the transistor is adapted to switch with the rising edge appearing at the output of the integrator circuit.

* * * * *